United States Patent [19]

Davidson et al.

[11] Patent Number: 4,740,943
[45] Date of Patent: Apr. 26, 1988

[54] MICRO MUSHROOM INSTRUMENTATION SYSTEM

[75] Inventors: Walter F. Davidson, Edwards, Calif.; Thomas D. Dorsey, Nashua, N.H.

[73] Assignee: The United States of America as represented by the Secretary of the Air Force, Washington, D.C.

[21] Appl. No.: 818,945

[22] Filed: Jan. 15, 1986

[51] Int. Cl.[4] .......................... H04N 5/46; G11B 5/09
[52] U.S. Cl. ........................................ 369/59; 369/49
[58] Field of Search ..................... 369/47, 48, 49, 59

[56] References Cited

U.S. PATENT DOCUMENTS

| | | | |
|---|---|---|---|
| 4,164,763 | 8/1979 | Briccetti et al. | 360/32 |
| 4,211,997 | 7/1980 | Rudnick et al. | 371/38 |
| 4,472,747 | 9/1984 | Schwartz | 360/32 |
| 4,473,850 | 9/1984 | Foerster et al. | 360/9.1 |
| 4,497,050 | 1/1985 | Beetstra | 369/59 |
| 4,512,006 | 4/1985 | Murakami et al. | 369/50 |
| 4,519,008 | 5/1985 | Takenouchi et al. | 360/79 |
| 4,543,617 | 9/1985 | Kobayashi | 369/59 |
| 4,575,770 | 3/1986 | Dietrich | 369/59 |
| 4,611,314 | 9/1986 | Ogara et al. | 369/59 |

Primary Examiner—Vincent P. Canney
Attorney, Agent, or Firm—William G. Auton; Donald J. Singer

[57] ABSTRACT

An electronics circuit which provides for the recording of instrumentation data on an optical disk is disclosed. The optical disk is formatted in a spiral format instead of concentric tracks. The spiral format allows data to be recorded without the gaps that would be associated with concentric tracks. The instrumentation system provides each channel with a programmable instrumentation amplifier, a six pole lowpass switched capacitor filter, a sample and hold amplifier, and a digital to analog converter to provide automatic offset capability. Since each channel has its own components, simultaneous samples of every channel can be captured. All of the input signal's channel variables can be changed under software control without hardware changes. A single board computer is used for a system controller.

3 Claims, 17 Drawing Sheets

FIG. 2A

MICRO MUSHROOM INSTRUMENTATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to data recording systems and particularly to a system for recording data on an optical disk in a spiral format of tracks.

Conventional recording of data on an optical disk entails the use of concentric tracks. Exemplary in the art, are the systems provided in the following U.S. patents, which are specifically incorporated by reference:

U.S. Pat. No. 4,472,747 issued to D. Schwartz on Sept. 18, 1984;
U.S. Pat. No. 4,473,850 issued to H. Foerster et al on Sept. 25, 1984;
U.S. Pat. No. 4,519,008 issued to T. Takenouchi et al on May 21, 1985;
U.S. Pat. No. 4,497,050 issued to T. Beetstra on Jan. 29, 1985;
U.S. Pat. No. 4,164,763 issued to M. Briccetti et al on Aug. 14, 1979;
U.S. Pat. No. 4,211,997 issued to P. Rudnick et al on July 8, 1980; and
U.S. Pat. No. 4,512,006 issued to T. Murakami et al on Apr. 16, 1985.

The Beetstra, Briccetti and Rudnick references disclose recording systems for recording information in digital format on a disk. Schwartz discloses a microcomputer system for converting an analog signal into digital form for storing in digital form a highly condensed code.

Foerster discloses an apparatus for recording digitally coded television signals on a recording medium. The recording process includes the use of buffer stores operating in a first-in first-out (FIFO) mode.

The Takenouchi reference discloses an apparatus for recording visual information. This apparatus includes a monitor display.

The use of concentric tracks is common in the recording of data on disks, such as the magnetic hard disks. The concentric track format is replete with inherent gaps which are spread throughout the recorded data stream. These gaps are manifested, not in lost data, but lost time which is present in the form of a track seek time, as the system attempts to store or retrieve a continuous data stream.

There presently exists the need to store and retrieve instrumentation data on hard disks without a track seek time. The present invention is intended to satisfy that need.

SUMMARY OF THE INVENTION

The present invention comprises an electronics circuit which provides for the recording of instrumentation data on an optical disk. The optical disk is formatted in a spiral format instead of concentric tracks. The spiral format allows data to be recorded without the gaps that would be associated with concentric tracks.

The recording of data on an optical disk in spiral format is accomplished using: an analog input front end, a digital input front end, a multiplexer, a clock and timing system, a single board computer, an optical disk drive system, a monitor, an analog output, and two interface boards.

The analog and digital front ends are units which respectively receive analog and digital input signals from a number of channels. The analog front end conditions all incoming analog signals to fall within a range of ±5 volts for analog-to-digital A/D conversion.

After the incoming analog signals have been converted to digital by an A/D converter, the multiplexer produces a continuous data stream for the system by multiplexing the incoming digital signals (from the digital front end) with the converted analog signals. This continuous data stream is conducted by the first interface into the optical disk drive where it will be recorded on an optical disk in spiral format.

Connected to the first interface is the single board computer which directs that the continuous data stream be recorded in the spiral format. The first interface is therefore a small computer system interface (SCSI) as well as a first-in first-out (FIFO) which conducts the data stream to the disk drive. The FIFO portion is necessary to allow the disk drive to continuously record the data because the optical disk requires data in bursts to allow time for CRC generation and sector header reading.

The analog output recaptures the analog inputs by converting the signals back to analog using digital-to-analog converters (DAC). The analog output receives its signals from the multiplexer and outputs analog signals on one or more channels.

The timing board provides all of the time dependent control signals to the system. The timing signals are sent to the analog and digital input front ends, the multiplexer, and the interface with the single board computer. The control timing provided by the timing board is designed to match the system with the required timing of the optical disk drive.

The clock provides the system with a digital representation of the current time and date. This digital signal is input through the digital input front end.

One embodiment of the present invention entails the use of eight circuit boards, each containing one of the system elements described above, including the single board computer. Attached to these boards are: the optical disk drive which records the data; a terminal which controls the system; and a hard copy printer. Together these elements allow analog and digital input signals to be multiplexed into a continuous data stream and recorded together in a spiral format on an optical disk.

It is an object of the present invention to provide a system which records data on an optical disk in spiral format.

It is another object to record data in a continuous stream without gaps.

It is another object to be able to store and retrieve data with a minimum track seek time.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 2A and 2B form a schematic of the analog input front end of FIG. 1;

DETAILED DESCRIPTION OF THE PREFERRED EMBODIMENT

The present invention is a system which records data on a disk in a spiral format.

Figure 1:
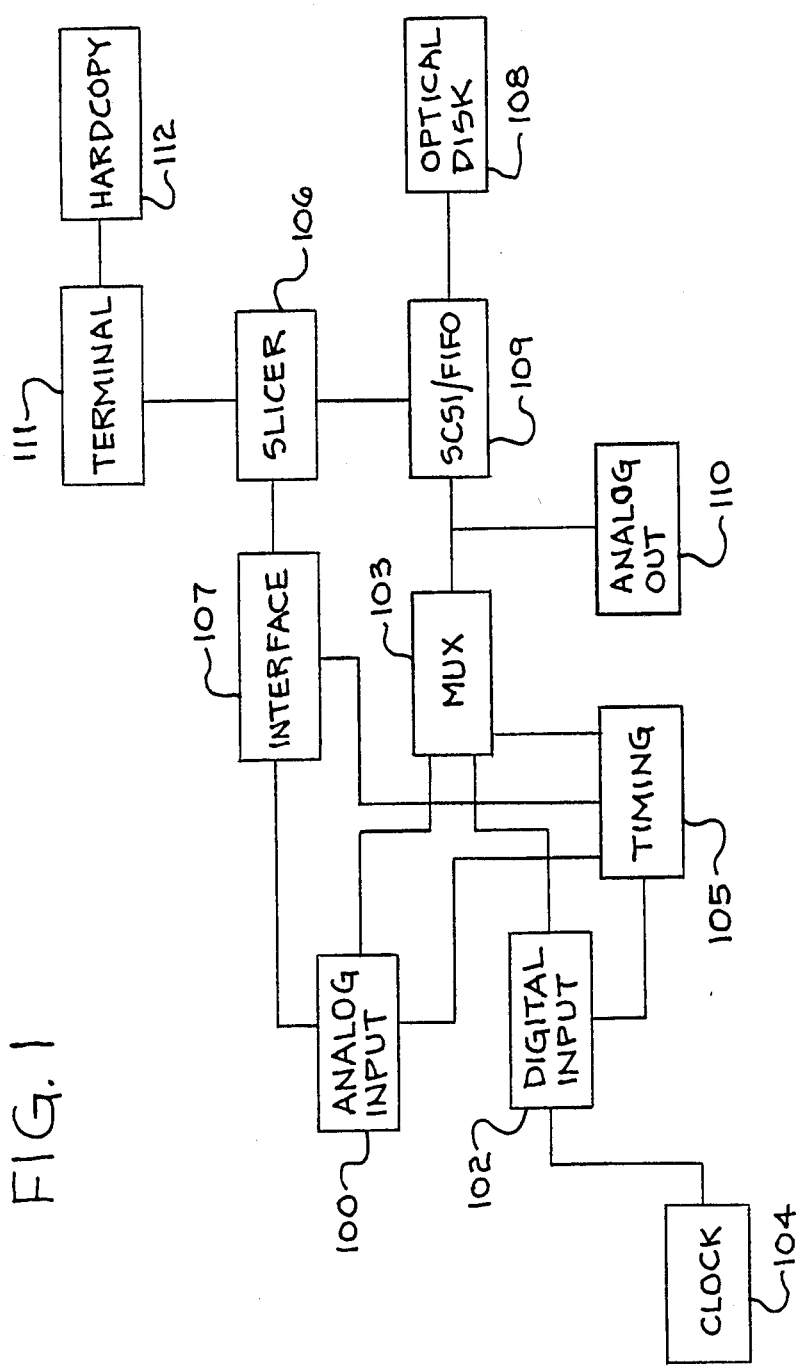
FIG. 1 is a block diagram of the preferred embodiment of the present invention.

The reader's attention is now directed towards FIG. 1, which is a block diagram of the preferred embodiment of the present invention. The system of FIG. 1 records data on an optical disk in a spiral format using: an analog input front end 100, a digital input 102, a multiplexer 103, a timing clock 104, a timing system 105, a microprocessor 106, a microprocessor interface 107, an optical disk drive 108, an interface 109 with the disk drive, an analog output 110, a terminal 111, and a hard copy printer 112. These elements, with the exception of the disk drive, terminal, and printer, have been fabricated for the present invention in the form of eight different circuit boards in one embodiment of the present invention. While sufficient information is described below to permit one skilled in the art to duplicate this system, the invention is not intended to be limited to this one example.

The analog input front end 100 receives analog input signals from a number of channels and prepares them for conversion into digital. All analog signals received by the analog front end 100 are conditioned into a range of −5 to +5 volts.

Figure 2A:
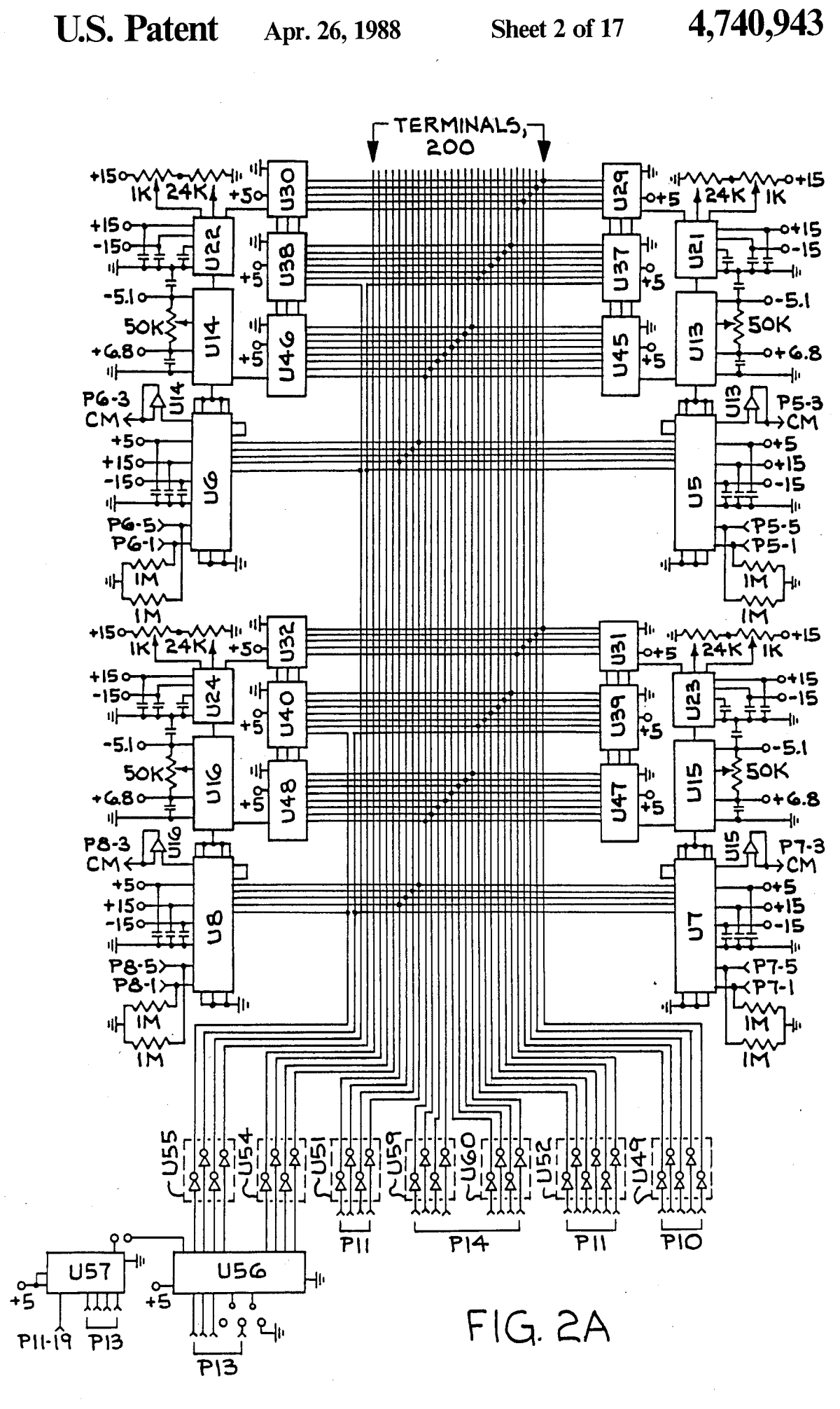
Figure 2B:
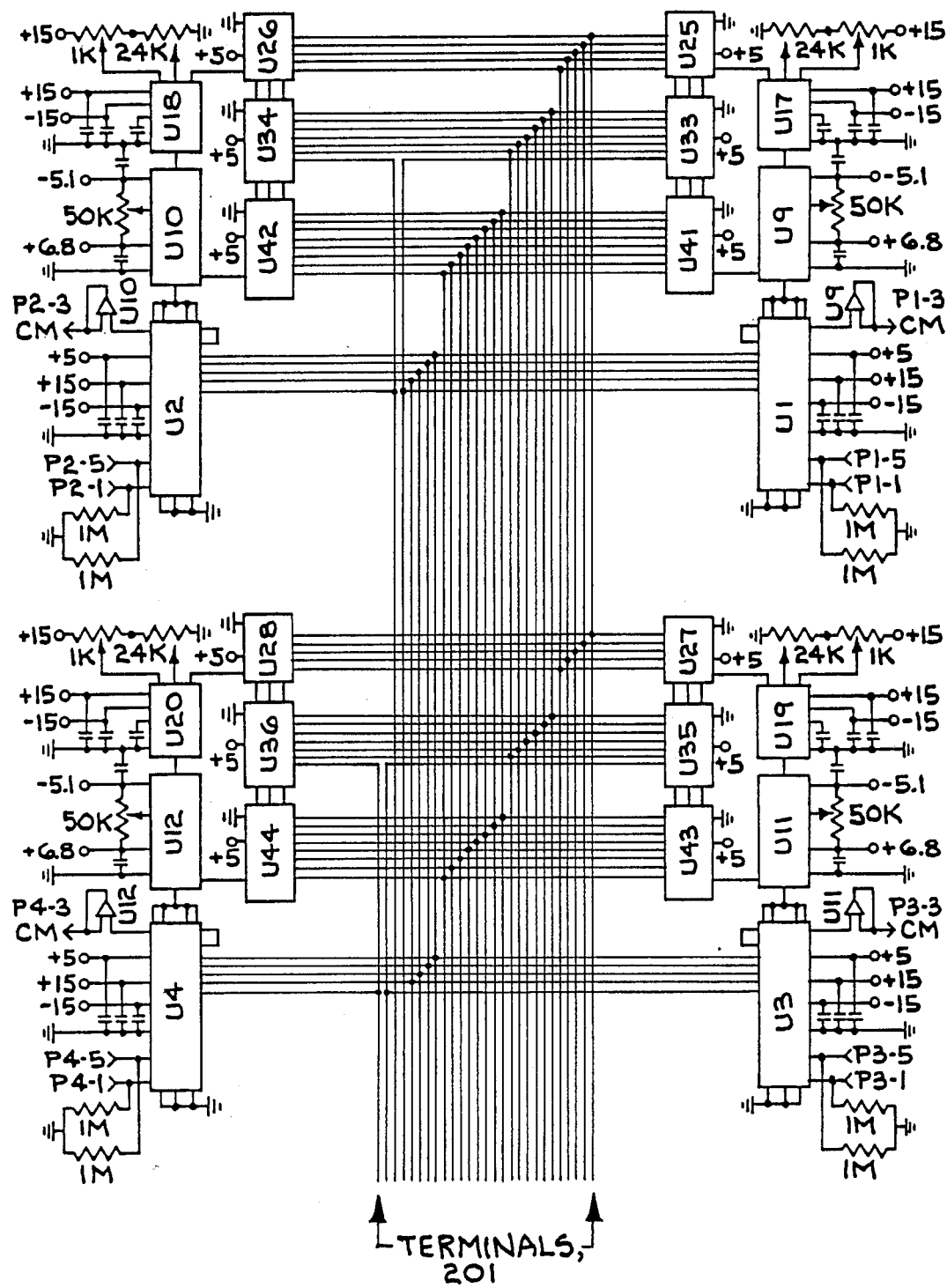

FIGS. 2A and 2B fit together to form a schematic of the circuit board which can be used for an analog input and Table 1 is a parts listed associated with the schematic of FIG. 1. This system is capable of recording about 60 analog channels with a bandwidth of 1.25 KHz. Each analog front end board, such as the one of FIG. 2, contains 8 channels.

At the extreme right of FIG. 2A are twenty seven separate electrical connections labled "Terminals, 200". These electrical connections are connected, in order, with the twenty-seven electrical connections labled "Terminals 201" in FIG. 2B to form a single circuit board which can perform as the analog input front end 100 of FIG. 1. The interconnections between the pin-outs of all circuit boards is given at the end of the description provided herein.

The signal processing functions of the analog input of FIGS. 2A and 2B are as follows. The incoming signal is first amplified by a Burr-Brown 3606 programmable instrumentation amplifier. This amplifier is programmable by a four bit word to provide gains of 1 to 1024 in multiples of two. The common mode of the incoming signal is buffered by an amplifier in the MF6 filter chip and is available to drive the shield of the incoming signal cable to reduce noise pickup. The output of the 3606 is fed to a National MF6-50 switched capacitor filter. The MF6-50 provides a six pole lowpass Butterworth filter with a filter cutoff frequency of 1/30th of an incomming clock. The clock for the MF6-50 is selected by a 74LS151 multiplexer. Light different filter frequencies can be selected from 78 Hz to 10 KHz in multiples of two. The filtered signal coming out of the MF6-50 is fed to a Burr-Brown SHC298 sample and hold amplifier. The SHC298 samples the incoming signal at one of five rates from 1.87 KHz to 29.92 KHz determined by the clock gated to it by another 74LS151 multiplexer. This gives a sample to cycle ratio of 2.99, which is well above the Nyquist cutoff of 2. The four bits for the programmable amplifier plus the three bits for the filter cutoff plus the three bits for the sample and hold rate are combined into one 16 bit input word.

TABLE 1

| ANALOG FRONT END PARTS LIST | | | |
|---|---|---|---|
| C1-38 | .1 uF | C39-46 | 1000pF |
| C47-67 | .1 uF | C68-73 | 1 uF |
| R1-16 | 1 M | R17-24 | 50K pot |
| R25-32 | 1K pot | R33-40 | 24K |
| R41 | 120 | R42 | 2K pot |
| R43 | 120 | R44 | 2K pot |
| R45 | 120 | R46 | 2K pot |
| U1 | 3606 | U2 | 3606 |
| U3 | 3606 | U4 | 3606 |
| U5 | 3606 | U6 | 3606 |
| U7 | 3606 | U8 | 3606 |
| U9 | MF6-50 | U10 | MF6-50 |
| U11 | MF6-50 | U12 | MF6-50 |
| U13 | MF6-50 | U14 | MF6-50 |
| U15 | MF6-50 | U16 | MF6-50 |
| U17 | SHC298 | U18 | SHC298 |
| U19 | SHC298 | U20 | SHC298 |
| U21 | SHC298 | U22 | SHC298 |
| U23 | SHC298 | U24 | SHC298 |
| U25 | 74LS151 | U26 | 74LS151 |
| U27 | 74LS151 | U28 | 74LS151 |
| U29 | 74LS151 | U30 | 74LS151 |
| U31 | 74LS151 | U32 | 74LS151 |
| U33 | 74LS373 | U34 | 74LS373 |
| U35 | 74LS373 | U36 | 74LS373 |
| U37 | 74LS373 | U38 | 74LS373 |
| U39 | 74LS373 | U40 | 74LS373 |
| U41 | 74LS151 | U42 | 74LS151 |
| U43 | 74LS151 | U44 | 74LS151 |
| U45 | 74LS151 | U46 | 74LS151 |
| U47 | 74LS151 | U48 | 74LS151 |
| U49 | 74LS04 | U50 | LM337 |
| U51 | 74LS04 | U52 | 74LS04 |
| U53 | 74LS04 | U54 | 74LS04 |
| U55 | 74LS04 | U56 | 74LS138 |
| U57 | 74LS04 | U58 | LM317 |
| U59 | 74LS04 | U60 | 74LS04 |

Figure 3A:
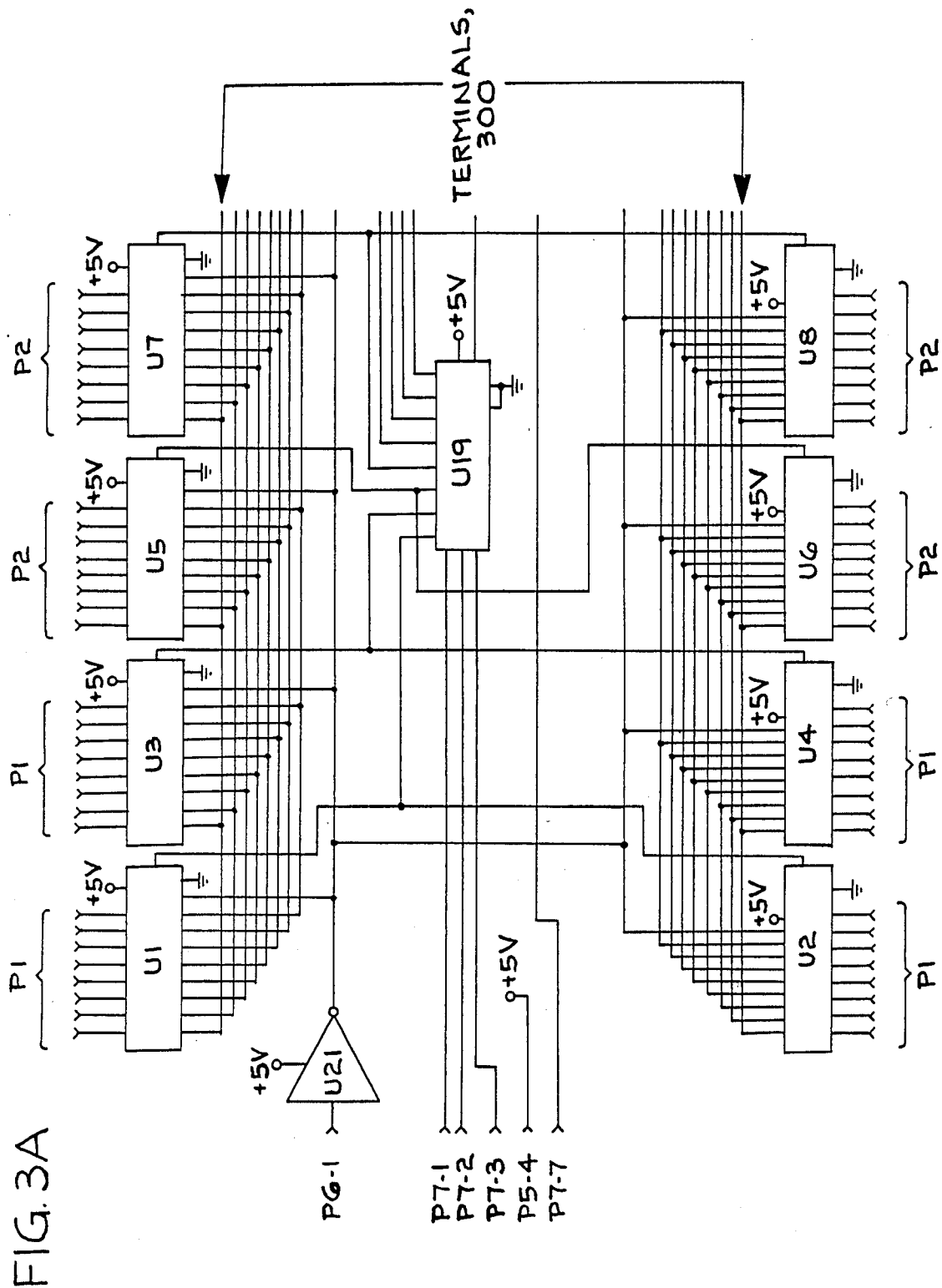
FIGS. 3A and 3B form a schematic of the digital input front end of FIG. 1.
Figure 3B:
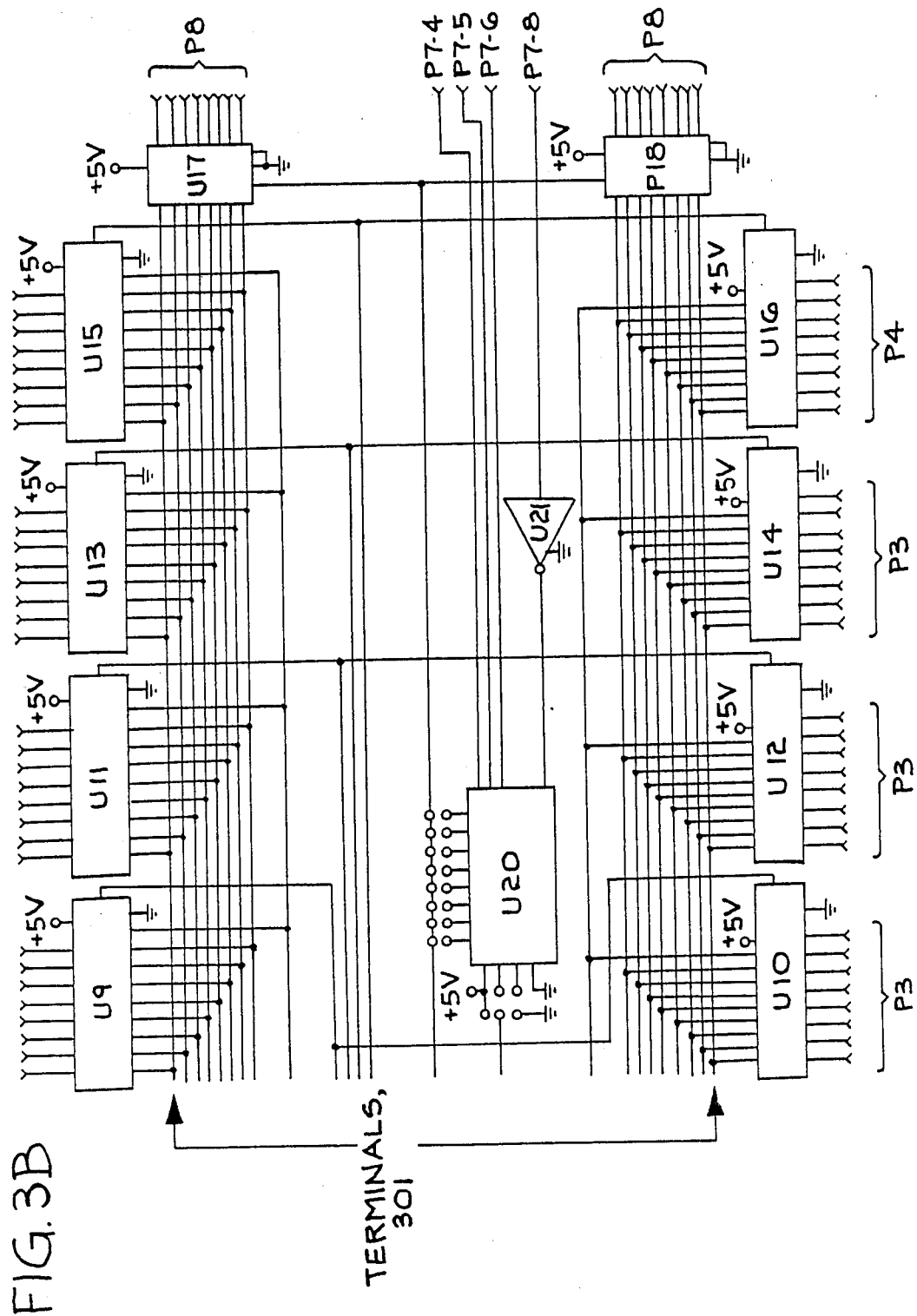

The digital front end 102 of FIG. 1 provides the system with 8 sixteen bit digital inputs per board. FIGS. 3A and 3B form a schematic of a circuit board which can be used as the digital front end when the 24 electrical connectors labled terminals 300 are connected with the terminals, 301 of FIG. 3B. Table 2 lists the commercially available parts associated with FIGS. 3A and 3B.

TABLE 2

| DIGITAL FRONT END PARTS LIST | | | |
|---|---|---|---|
| C1-11 | .1 uF | U2 | 74LS373 |
| U1 | 74LS373 | U2 | 74LS373 |
| U3 | 74LS373 | U4 | 74LS373 |
| U5 | 74LS373 | U6 | 74LS373 |
| U7 | 74LS373 | U8 | 74LS373 |
| U9 | 74LS373 | U9 | 74LS373 |
| U11 | 74LS373 | U12 | 74LS373 |
| U13 | 74LS373 | U14 | 74LS373 |
| U15 | 74LS373 | U16 | 74LS373 |

TABLE 2-continued

| DIGITAL FRONT END PARTS LIST | | | |
|---|---|---|---|
| U17 | 74LS245 | U18 | 74LS245 |
| U19 | 74LS138 | U20 | 74LS138 |
| U21 | 74LS504 | | |

Each input word on the board of FIGS. 3A and 3B uses two 74LS5373's to latch the input word. All of the latches are strobed together at a rate of 3.74 KHz. This provides simultaneous sample and hold on all of the digital input data. Two 74LS138's are responsible for decoding the address and turning on the appropriate 74LS373's. The board uses a pair of 74LS245's as buffers to drive the 16 bit parallel data to the system multiplexer. Only one of the eight 16 bit inputs appear on P8 at one time. P7, the channel address, determines which input channel is to be put out.

The digital front end board of FIGS. 3A and 3B has eight connectors P1 through P8. Connectors P1 through P4 are the digital inputs. P3 is the power input connector. The board only requires +5 volts. P6 provides the sampling strobe from the TIMING board. P7 controls which channel to output. P8 is the 16 bit output data.

The multiplexer 103 of FIG. 1 gates data from each of the input channels, both analog and digital, into the data stream at the proper time. The analog conditioned signals coming from the analog front end 100 boards, are multiplexed, buffered, and sent to a Burr Brown ADC803 1.5 USEC, 12 bit analog to digital converter (ADC). The digital output of the analog to digital converter is strobed into latches. The signals from the digital front end 102 get to the board via a 16 bit parallel path and are also strobed into latches. In this way, the multiplexer 103 of FIG. 1 forms a continuous data stream of digital signals for the disk drive 108 to store from the analog and digital front ends 100 and 102.

Since multiplexers are well known in the art, detailed description of the multiplexer 103 of FIG. 1 is not deemed necesary. In the present invention, the multiplexer was fabricated into a circuit board which uses a 74LS138 to determine which of the analog multiplexers to enable. The multiplexers are Burr-Brown MPC800's. They have a settling time of 250 nSEC. The output of the multiplexer is buffered by a National LH0033 high speed buffer, and fed to the Burr-Brown ADC803 12 bit A/D. The output of the A/D is latched into three 74LS374's. Three latches are used so that the data can be gated to the SCSI/FIFO 104 board 8 bits at a time. Data is latched into the 74LS374's by a strobe coming from the timing board 105.

Figure 4A:
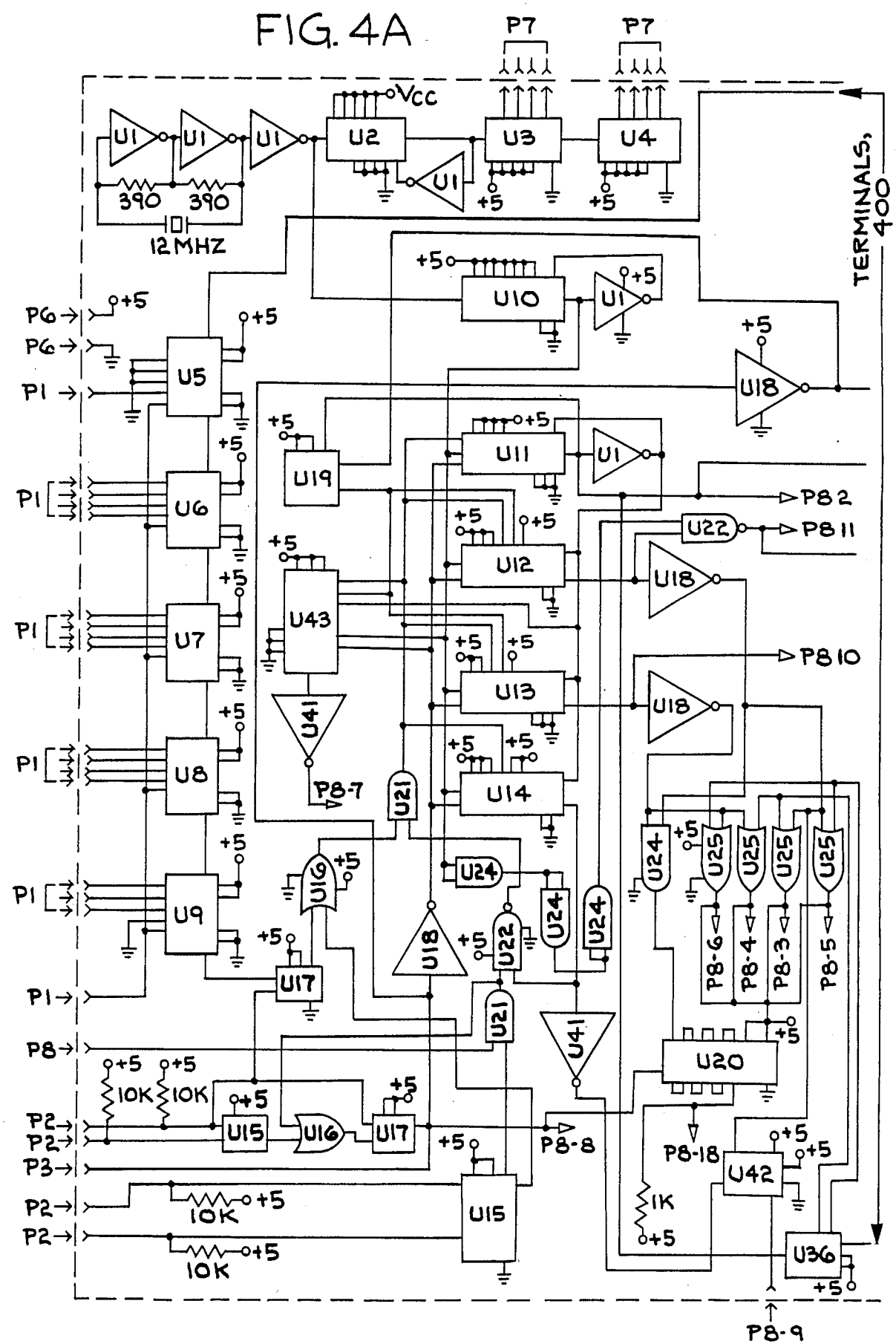
FIGS. 4A and 4B form a schematic of the timing board of FIG. 1.
Figure 4B:
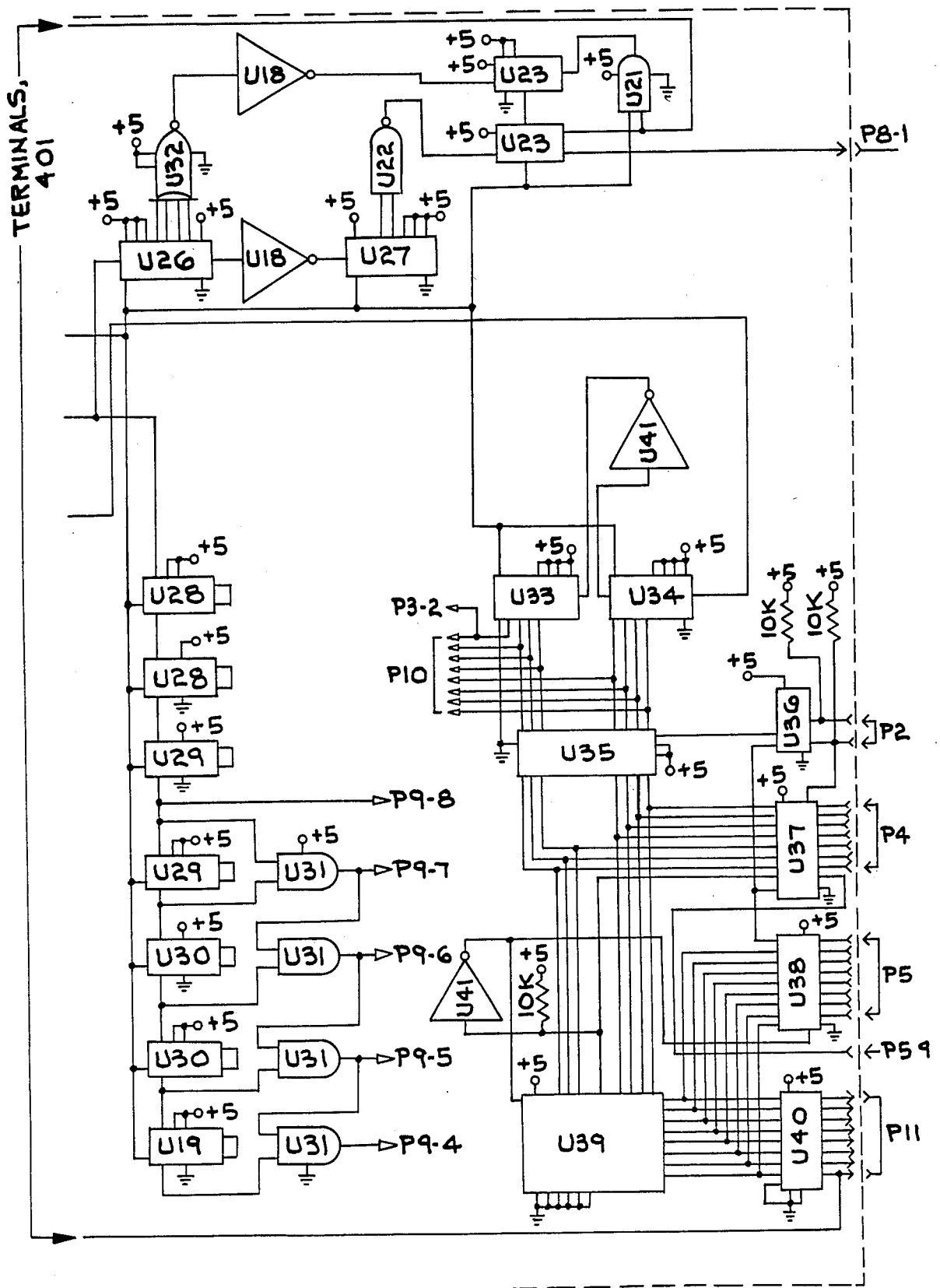

FIGS. 4A and 4B fit together, at terminals 400 and 401, to form a schematic of a circuit board which can be used as the timing board 105 of FIG. 1 and Table 3 is a parts list associated with the schematic.

TABLE 3

| TIMING PARTS LIST | | | |
|---|---|---|---|
| C1-14 | .1 uF | R3 | 1K |
| R1-2 | 390 | C68-73 | 1 uF |
| R4-10 | 10K | | |
| U1 | 74LS04 | U2 | 74LS163 |
| U3 | 74LS163 | U4 | 74LS163 |
| U5 | 74L193 | U4 | 74LS193 |
| U7 | 74L193 | U8 | 74LS193 |
| U9 | 74L193 | U10 | 74LS163 |
| U11 | 74L163 | U12 | 74LS163 |
| U13 | 74L163 | U14 | 74LS163 |
| U15 | 74L74 | U16 | 74LS32 |

TABLE 3-continued

| TIMING PARTS LIST | | | |
|---|---|---|---|
| U17 | 74L74 | U18 | 74LS04 |
| U19 | 74L74 | U20 | 74LS245 |
| U21 | 74L08 | U22 | 74LS00 |
| U23 | 74L74 | U24 | 74LS08 |
| U25 | 74L32 | U26 | 74LS161 |
| U27 | 74L161 | U28 | 74LS74 |
| U29 | 74L74 | U30 | 74LS74 |
| U31 | 74L08 | U32 | 74LS25 |
| U33 | 74L161 | U34 | 74LS161 |
| U35 | 74L245 | U36 | 74LS74 |
| U37 | 74L373 | U38 | 74LS373 |
| U39 | 6116 | U40 | 74LS245 |
| U41 | 74LS04 | U42 | 74LS74 |
| XTAL | 12 MHz | | |

The timing board 105 provides all of the time dependent control signals to the micro mushroom instrumentation system. The board has three major subsections: control timing, filter clocks, and channel selection.

Figure 5:
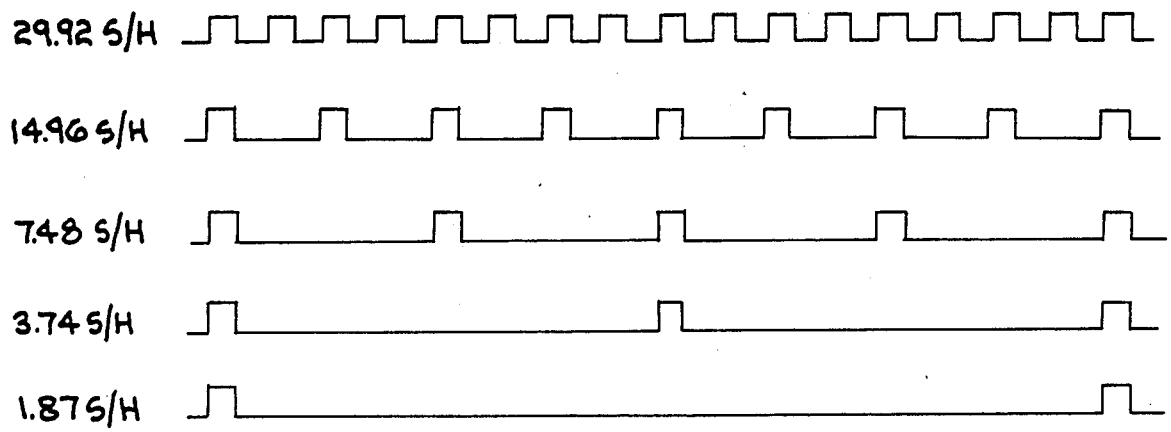
FIGS. 5 and 6 are illustrations of the timing signals of the timing board of FIG. 4.
Figure 6:
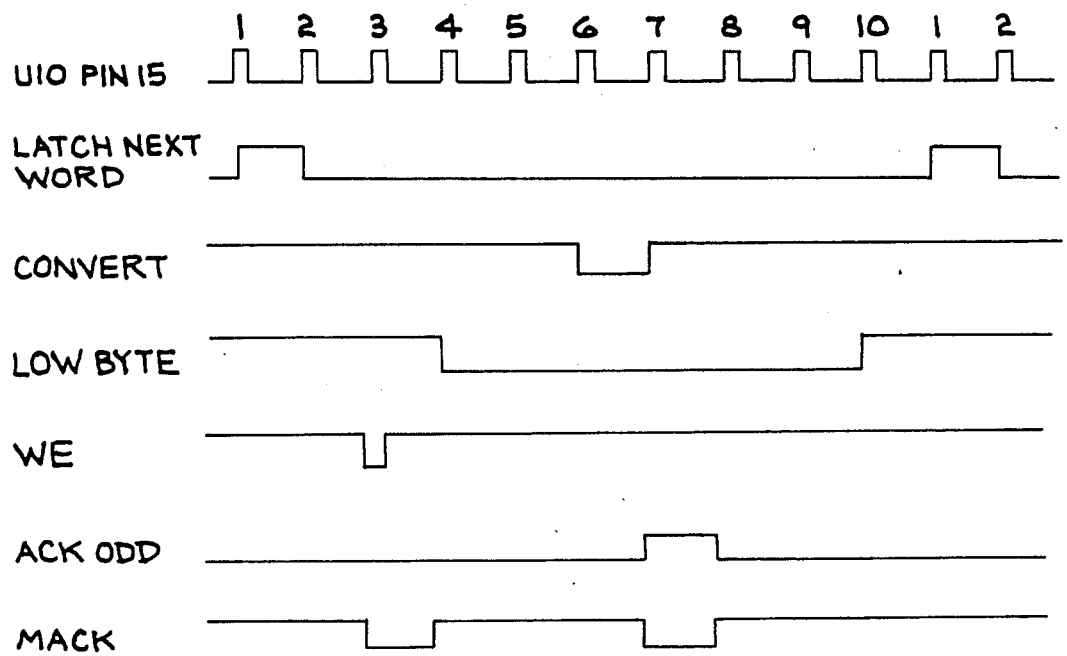

All of the control timing is derived from a 12 MHz crystal oscillator by using counters to divide down the master clock. The resultant waveforms are shown in FIGS. 5 and 6. The control timing has two modes of operation, realtime and record. In the realtime mode all of the timing is strictly dependent upon the clock with no external feedback. In the record mode the cycle will not restart until the MREQ line is valid. This allows the timing to synchronize with the disk so that data is not lost.

The control timing was designed to match the timing of the optical disk drive 108. The media in the drive revolves at a speed of 1122 revolutions per minute, with 25–1024 byte sectors on a track. This results in an average data rate of 478,720 bytes per second. While it was necessary to slightly exceed this rate in the data stream to insure that data would be ready to be written, it is desirable to match this speed as closely as possible so as to obtain uniform sampling of data. It is then necessary to use the pulses from the drive to synchronize the data. The timing board 105 divides the 12 MHz crystal clock by 5 using 74LS163. The resultant clock divided by 10 by another 74LS163 has a cycle rate of 240,000 words per second. Since each word has two 8 bit bytes, the resultant 480,000 closely matches the drives 478,720 bytes per second.

The timing pulses are generated using 74LS163's as a counter based controller. One timing pulse latches the data on the multiplexer board 103 to the next word to be put on the data stream.

The timing board 105 also has five 74LS193 counters used to count the number of 1024 byte sectors transferred. Before starting the transfer of data to the disk, these counters are preset to the desired number of sectors. At terminal count the counters stop the timing board control cycle.

The filter clock section of the timing board 105 takes the 12 MHz master clock and divides it by 12 using a 74LS163 to obtain a 1 MHz clock. Using two 74LS163's the 1 MHz clock is divided by 2, 4, 8, 14, 32, 64, 128, and 256 to obtain output clocks of 500, 250, 135, 62.5, 31.25, 15,625, 7.8125, and 3.90625 KHz respectively. Since the filters used are MF6-50's with a cutoff fixed at 1/50 of the incoming clock, the clock frequencies correspond to filter frequencies of 10, 5, 2.5, 1.25, 0.625, 0.3125, 0.15625, and 0.078125 KHz. These clocks run continuously without being effected by the mode of the timing board.

The channel selection section of the timing board 105 consists of a 6116 2K×8 RAM and associated parts that are used as a lookup table for the channel word. This section has two modes of operation: PROGRAM and RUN. When in PROGRAM mode a 74LS373 supplies the 6116 RAM with the address to be programmed. The 74LS373 receives its data from the SLICER INTERFACE board via connector P4. The data to be written in the selected location comes through another 74LS373 from the SLICER INTERFACE board via P5. The addresses of the RAM correspond to the location in the data map. The data in that location is the channel number to be selected.

In the RUN mode the 74LS373's are deselected and a pair of 74LS161 counters step sequentially through the RAM. The 74LS161's count pulses from the control timing logic that occur once per data word. The 7 bits of the counters are buffered by a 74LS245 and used to address the RAM. Since only 7 bits are used, the cycle length is set to 128 words. The data from the RAM is buffered by a 74LS245 and sent out on connector P11 for use in channel selection. The 74LS161's count is put out on connector P10.

The timing board 105 has eleven connectors P1 through P11. P1 is the number of sectors to transfer. P2 is the control from the SLICER INTERFACE board 106. P3 is a status port. P4 is the address of the map RAM to program. P5 is the data to put in the map RAM. P6 is the power input connector. The board requires +5 volts. P7 is the filter clock outputs. P8 are the timing control pulses. P9 is the sample and hold strobes. P10 is the location counter output. P11 is the channel selection output.

The embodiment of the invention of FIG. 1 uses a SLICER 80186 single board computer as a system controller. The SLICER interface 107 is a circuit board which consists of 8 output ports and two input ports. A schematic of this circuit is provided in FIGS. 7A and 7B. A table of the components is provided as Table 4.

TABLE 4

| SLICER INTERFACE PARTS LIST | | | |
|---|---|---|---|
| C1-9 | .1 uF | | |
| R1 | 1K | | |
| U1 | 74LS373 | U2 | 74LS373 |
| U3 | 74LS373 | U4 | 74LS373 |
| U5 | 74LS373 | U6 | 74LS373 |
| U7 | 74LS373 | U8 | 74LS373 |
| U9 | 74LS245 | U10 | 74LS245 |
| U11 | 74LS245 | U12 | 74LS245 |
| U13 | 74LS245 | U14 | 74LS245 |
| U15 | 74LS138 | U16 | 74LS138 |
| U17 | 74LS04 | U18 | 74LS07 |
| U19 | 74LS00 | U20 | 74LS04 |
| U21 | 74LS373 | U22 | 74LS373 |

Figure 7A:
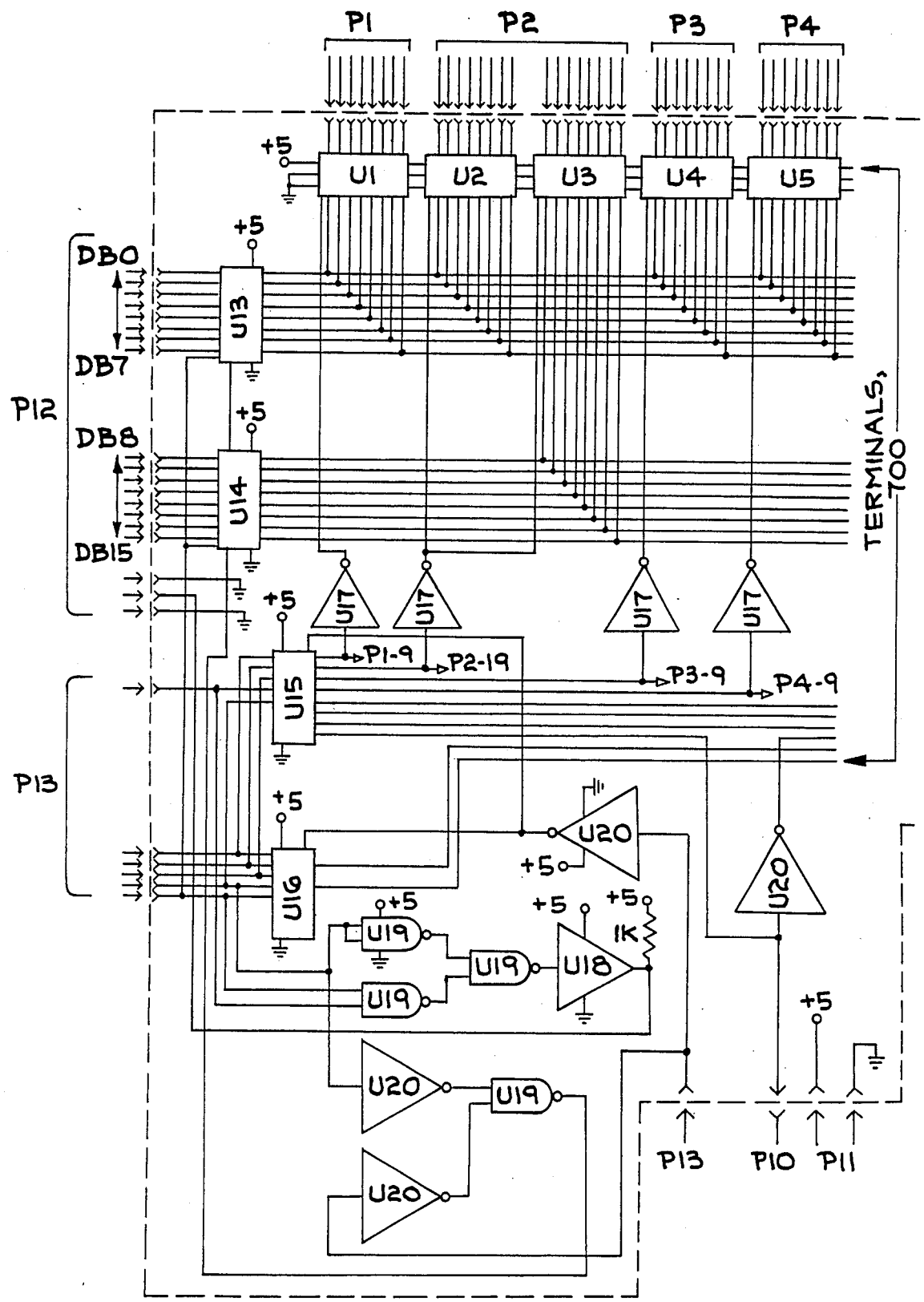
FIGS. 7A and 7B form a schematic of the SLICER interface board.
Figure 7B:
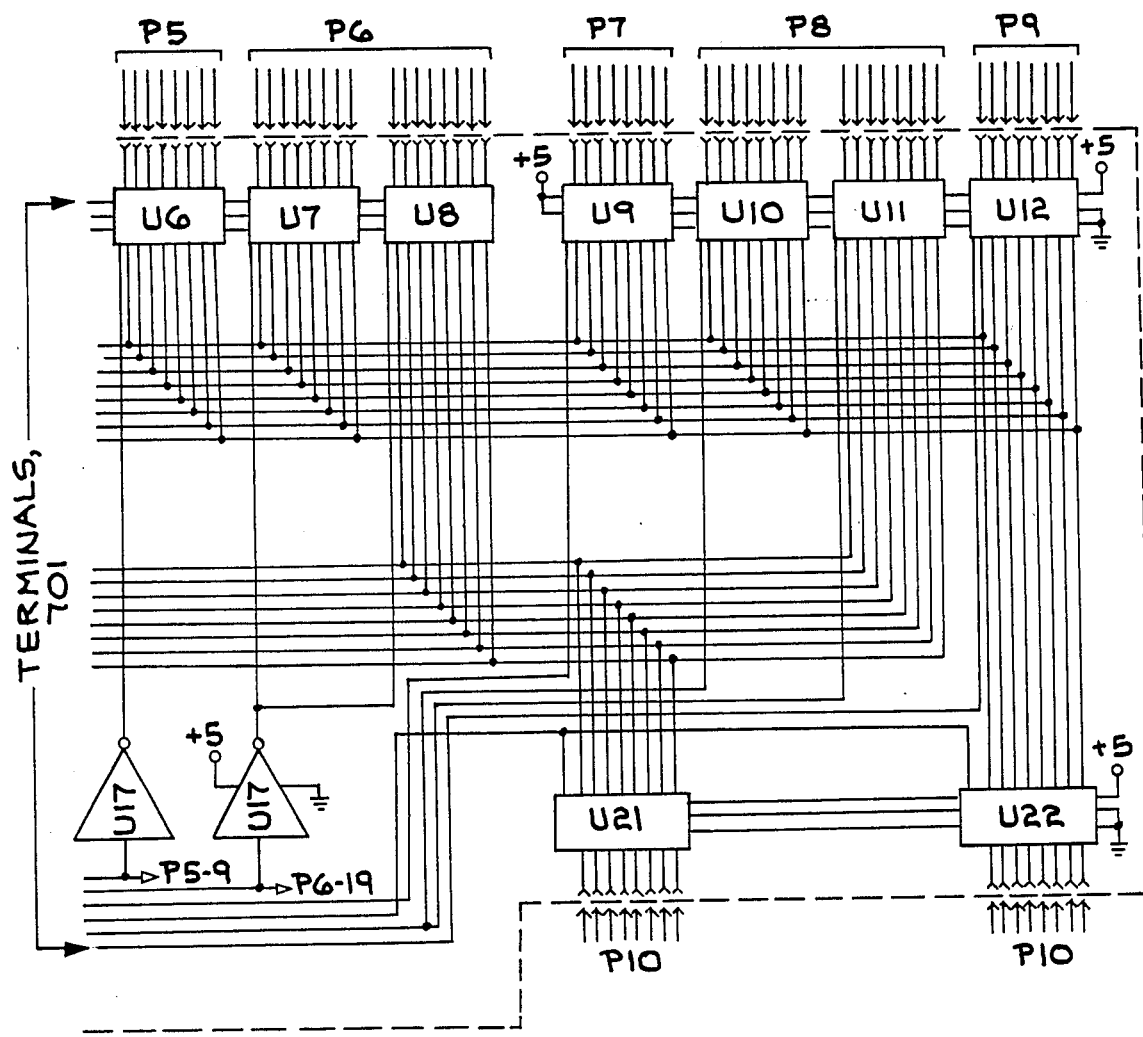

As in the case of the similar preceding Figures, FIGS. 7A and 7B may be combined by connecting, in order, terminals 700 to terminals 702.

The SLICER interface 107 uses a pair of 74LS245's to buffer the SLICER's 16 bit data bus. All output ports but one use 74LS373's to latch the data. The other output port uses a 74LS245 to provide pulse data for the control strobes. The input ports use 74LS245's to buffer the incoming data.

The SLICER interface uses a pair of 74LS138's to decode the port address and select lines. The board decodes the SLICER's PCS5 line, which is a programmable select line normally set to a base address 0280H. Table 5 shows the addresses and function of the ports.

TABLE 5

| SLICER PORT ASSIGNMENT | |
|---|---|
| OUTPUT | |
| 0280H | ANALOG CHANNEL ADDRESS |
| 0282H | ANALOG SETUP DATA |
| 0284H | MAP ADDRESS |
| 0286H | MAP DATA |
| 0286H | REALTIME RAM ADDRESS |
| 028AH | NUMBER OF SECTORS |
| 028CH | CONTROL |
| 028EH | ANALOG OFFSET |
| INPUT | |
| 0288H | REALTIME RAM DATA |
| 028CH | STATUS |

The SLICER interface 107 has 13 connectors, P1 through P13. P1 through P7 are output ports. P8 and P9 are input ports. P10 is an output port. P11 is the power input connector. The board requires 5 volts. P12 and P13 are the connectors to the SLICER 106.

The time clock 104 provides the system with a digital representation of the current time. The time is expressed as Y:DDD:HH:MM:SS:UUUUUU. Y represents one digit of the year. For example, "4" is for 1984. DDD represents the Julian day of the year, example "119" for the 119th day of the year. HH represents the hour of the day from "00" to "23". MM is the minute. UUUUUU is the number of microseconds into the current second, with a range of "000000" to "999999". The time clock consists basically of a chain of counters and need not be described in detail. The digital representation of the time and data are input from the time clock 104 into the digital input 105.

The analog output 110 of FIG. 1 uses digital-to-analog converters (DAC) to reconstruct the analog data on a channel. Since such devices are well known in the art, a detailed figure and description are not deemed necessary.

The analog ouput board 110 uses a 74LS245 to buffer the incoming data, which is then latched into a pair of 74LS374's. The parallel data from the 74LS374's is strobed into one of the two AD390 Quad 12 bit DAC's to reconstruct analog data.

The SCSI/FIFO board 109 provides the SLICER 80186 single board computer 106 with a Small Computer System interface (SCSI) and buffers the data coming from the micro mushroom to the optical disk drive 108. The SCSI interface 109 is basically an 8 bit parallel interface with interlocking handshaking. The interface is set up to address the first device on the SCSI bus.

The First in First Out (FIFO) portion of the board 109 is necessary in order to allow the optical disk drive to record data continuously. The optical disk requires data in bursts in order to allow time for CRC generation and sector header reading and writing. If the required amount of data (1024 bytes) is not ready in time, and the drive passes the next sector to be written, a one revolution latency will occur as it is necessary to wait for the desired sector to come around again. The FIFO's 128 word by 8 bit organization allows for this slight differential in speeds between generation of data and writing. Due to the optical disks internal four sector buffer, a gap in time of up to one revolution will occur after the fourth sector written. This occurs because the drive will take data until the buffer is full while it is trying to locate the first sector to be written. After this gap the drive will write continuously the specified number of sectors.

Figure 8A:
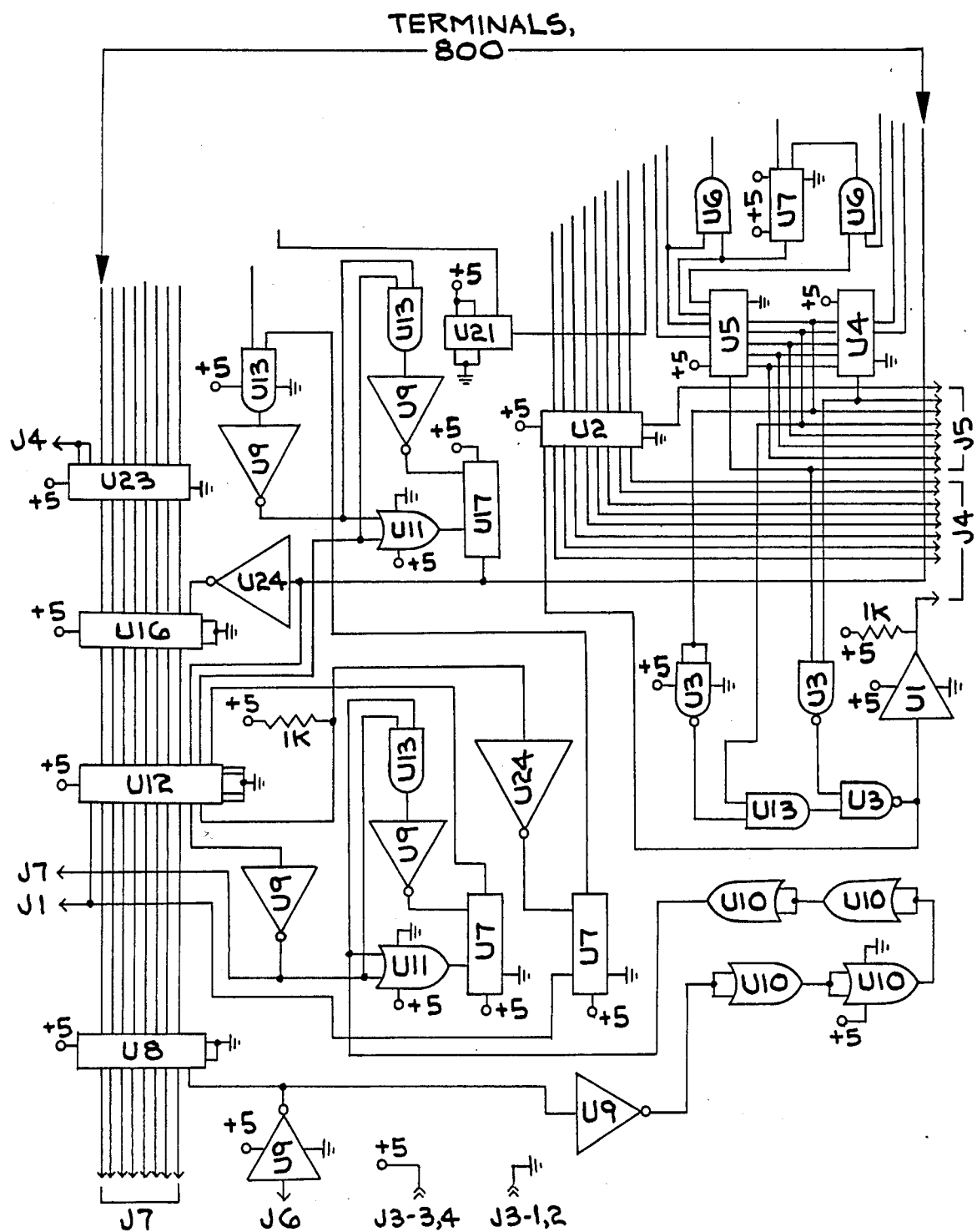
FIGS. 8A and 8B form a schematic of the SCSI/-FIFO board of FIG. 1.
Figure 8B:
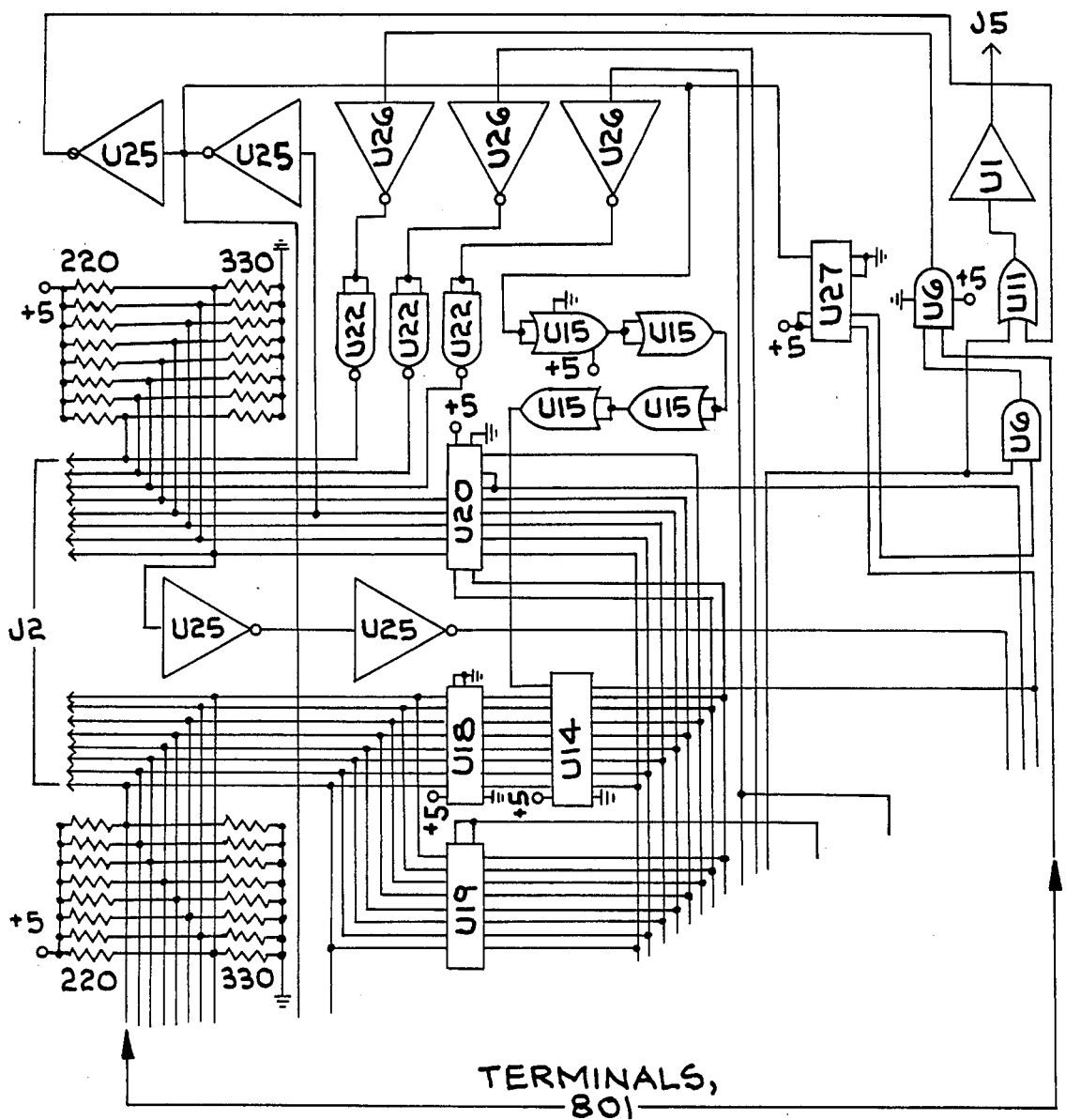

FIGS. 8A and 8B may be interconnected at terminals 800 and 801 to form a schematic of the SCSI/FIFO board 109.

Table 6 is the list of parts associated with this schematic.

TABLE 6
SCSI/FIFO PARTS LIST

| C1-11 | .1 uF | | |
|---|---|---|---|
| R16 | 220 | R17-32 | 330 |
| R33-34 | 1K | | |
| U1 | 7407 | U2 | 74LS138 |
| U3 | 74LS00 | U4 | 74LS138 |
| U5 | 74L138 | U6 | 74LS08 |
| U7 | 74LS74 | U8 | 74LS374 |
| U9 | 74LS14 | U10 | 74LS32 |
| U11 | 74LS32 | U12 | AMD8060 |
| U13 | 74LS14 | U14 | 74LS374 |
| U15 | 74LS32 | U16 | 74LS374 |

TABLE 6-continued
SCSI/FIFO PARTS LIST

| U17 | 74LS74 | U18 | 74LS240 |
|---|---|---|---|
| U19 | 74LS240 | U20 | 74LS240 |
| U21 | 74LS373 | U22 | 74LS38 |
| U23 | 74LS240 | U24 | 74LS14 |
| U25 | 74LS14 | U26 | 74LS14 |
| U27 | 74LS14 | | |

The SCSI/FIFO board has six connectors, P1 through P6. P1 is a control port from the SLICER interface board. P2 is the data input from the multiplexer board. P3 is the power input connector. The board requires +5 volts. P4 and P5 connect to the SLICER. P6 is the control signals from the timing board 105.

Table 7 is a table of the pin inteconnections between the circuit boards described above which fit together to form the embodiment of the invention of FIG. 1.

TABLE 7

| INTERCONNECTIONS | | |
|---|---|---|
| ANALOG FRONT END | | |
| P1 TRANSDUCER | | |
| P2 TRANSDUCER | | |
| P3 TRANSDUCER | | |
| P4 TRANSDUCER | | |
| P5 TRANSDUCER | | |
| P6 TRANSDUCER | | |
| P7 TRANSDUCER | | |
| P8 TRANSDUCER | | |
| P9 POWER | | |
| P10 TIMING P9 | | |
| P11 INTERFACE P2 | | |
| P12 MULTIPLEXER P1 P2 P3 P4 | | |
| P13 INTERFACE P1 | | |
| P14 TIMING P7 | | |
| DIGITAL FRONT END | | |
| P1 DIGITAL INPUT | | |
| P2 DIGITAL INPUT | | |
| P3 DIGITAL INPUT | | |
| P4 DIGITAL INPUT | | |
| P5 POWER | | |
| P6 TIMING P8 | MULTIPLEXER P8 | SCSI/FIFO P6 |
| P7 TIMING P11 | MULTIPLEXER P6 | |
| P8 MULTIPLEXER P7 | | |
| TIMING | | |
| P1 INTERFACE P6 | | |
| P2 INTERFACE P7 | SCSI/FIFO P1 | ANALOG OUTPUT P2 |
| P3 INTERFACE P9 | | |
| P4 INTERFACE P3 | ANALOG OUTPUT P3 | |
| P5 INTERFACE P4 | NANLOG OUTPUT P4 | |
| P6 POWER | | |
| P7 ANALOG P14 | | |
| P8 MULTIPLEXER P8 | DIGITAL P6 | SCSI/FIFO P6 |
| P9 ANALOG P10 | | |
| P11 MULTIPLEXER P6 | DIGITAL P7 | |
| INTERCONNECTIONS | | |
| INTERFACE | | |
| P1 ANALOG P13 | | |
| P2 ANALOG P11 | | |
| P3 TIMING P4 | ANALOG OUTPUT P3 | |
| P4 TIMING P5 | ANALOG OUTPUT P4 | |
| P5 MULTIPLEXER P11 | | |
| P6 TIMING P1 | | |
| P7 TIMING P2 | SCSI/FIFO P1 | ANALOG OUTPUT P2 |
| P8 MULTIPLEXER P10 | | |
| P9 TIMING P3 | | |
| P10 SPARE | | |
| P11 SLICER P2 | SCSI/FIFO P4 | |
| P12 SLICER P3 | SCSI/FIFO P5 | |
| ANALOG OUTPUT | | |
| P1 ANALOG OUTPUTS | | |
| P2 INTERFACE P7 | TIMING P2 | ANALOG OUTPUT P2 |
| P3 INTERFACE P3 | TIMING P4 | |
| P4 INTERFACE P4 | TIMING P5 | |
| P5 POWER | | |
| P6 MULTIPLEXER P9 | SCSI/FIFO P7 | |
| SCSI/FIFO | | |

TABLE 7-continued

| P1 | INTERFACE P7 | TIMING P2 | ANALOG OUTPUT P2 |
|---|---|---|---|
| P2 | OPTICAL DISK | | |
| P3 | POWER | | |
| P4 | SLICER P2 | INTERFACE P12 | |
| P5 | SLICER P3 | INTERFACE P13 | |
| P6 | TIMING P8 | MULTIPLEXER P8 | DIGITAL P6 |
| P7 | MULTIPLEXER P9 | ANALOG OUTPUT P6 | |

The software to operate the Micro Mushroom Instrumentation System hardware was written in BASIC and Assembly Language. An attempt was made to write as much as possible in high level language. Portions were written in Assembly Language because of hardware or speed requirements.

Figure 9:
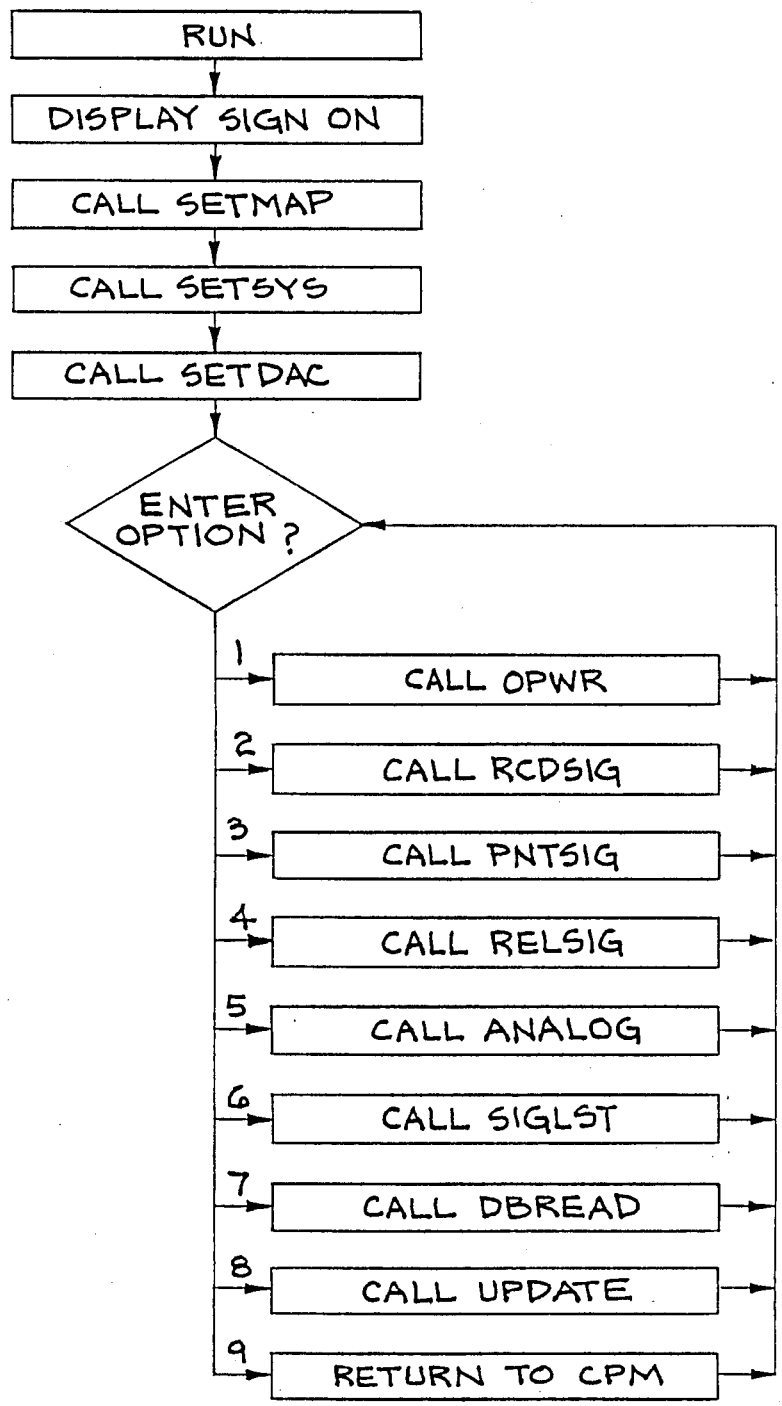
FIGS. 9-12 are flow charts of programs used by the SLICER (single board computer) to control the invention of FIG. 1.

The main program RUN sets up the Micro Mushroom hardware by calling three functions, SETMAP, SETSYS, and SETDAC. SETMAP loads the MAP RAM with the order of channels to sample. SETSYS sets the gain, filter frequency, and sample and hold rate on each of the analog channels. SETDAC sets up the eight digital to analog converters on the ANALOG OUTPUT board to display a word in the data stream. The program then displays a menu giving the user seven options. The options are RECORD DATA, PLAYBACK DATA, REAL TIME DATA, SET ANLOG OUTPUTS, SIGNAL LIST, DATABASE RETRIEVAL, AND EXIT. A flowchart of the program is shown in FIG. 9.

When the RECORD DATA option is chosen the program calls the function OPWR. OPWR prints a header and then searches the optical disk drive for the next available blank sector on the disk. This search is accomplished by doing a binary search of the disk. This search assumes that data are written sequentially on the disk without any gaps. This is a valid assumption when using the Micro Mushroom software.

The function then asks the user if they desire to write the data base onto the optical disk. If the user responds no the function skips this section. A yest answer will cause the function to call DBWRIT. DBWRIT then starts with the last sector on the optical disk looking for the first blank sector. This blank sector will be used as a directory entry to allow rapid location of a data base entry on the optical disk. This was necessary since an exhaustive search of the optical disk would have taken 14 hours. DBWRIT will then call RTIME to find out what the current time is. DBWRIT will then ask the user for comments to identify the data base to be written. This is a string input that will be displayed during DATA BASE RETRIEVAL to help the user decide which data base to reconstruct. The function then will put the next blank sector number, time and comments into an array to be written as a directory entry at the end of the optical disk. DBWR is then called to write the information in the array to the directory sector on the optical disk. DBWRIT then reads the data base from the file B:DBASE.TXT from the floppy disk and writes it to the optical disk using the function DBWR and returns to OPWR.

Figure 10:
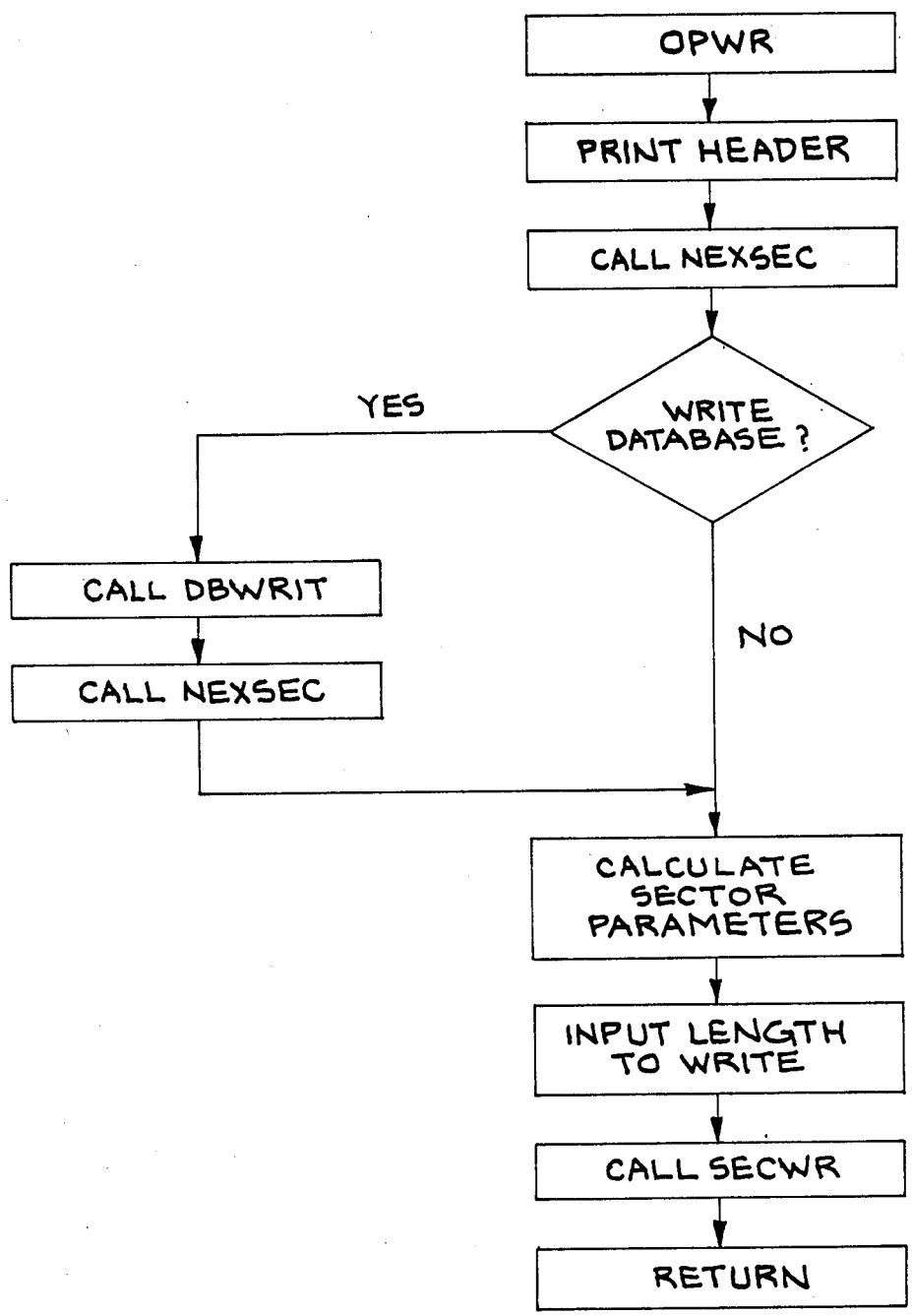

OPWR then does another binary search of the disk to locate the next blank sector. The user is then asked how many seconds of data they wish to record. The range of time is from 1 to 140 seconds. The limitation of 140 seconds is due to the SCSI limitation of transferring a maximum of 65535 sectors with one command. If instead of entering a number, the user enters an s, the function will ask for how many sectors to write instead of how many seconds. OPWR will then call SECWR to pass the number of sectors to write to the Micro Mushroom hardware and to perform the optical disk write. When the writing is complete, SECWR will return to OPWR which will then return to RUN which again displays the menu and waits for the next selection. OPWR is shown in FIG. 10.

When the PLAYBACK DATA option is chosen the program calls the function RCDSIG. RCDSIG prints a header on the terminal and reads in the file B:DBASE.TXT. A signal table of name, sample rate, gain, word position, and A and B coefficients is created. The next blank sector number is printed on the terminal to allow the user to know how much of the disk contains data. The user is prompted to enter the signal name. The signal table is searched for a match with the user's entry. If a match is not found, the user is asked to reenter the signal name. When a match is found, the user is asked to enter the search time. Instead of entering a time, the user has the option of entering the sector number. If a time was entered, RCDSIG will perform a binary search of the optical disk trying to locate the time. If the time cannot be found, the user is asked for another time. Once the sector number is located, SECRD is called to read in the data (one sector at a time) until the 512 word data and time arrays are full. RCDSIG uses DISP to send a time history plot of the signal to the graphics display. DISP uses the functions MEAN and STD to find the mean and standard deviation of the signal array. The array is then searched to find the maximum and minimum points. DISP calls TRGAPH to put the actual graphic information out. If the last sector read in was blank, REZERO is called to clear the optical disk drive from a fault condition that would occur by attempting to read a sector that had not been written. The user is then asked if they want a PSD. If the answer is no, the user is asked to enter the next time to search. Entering an N will ask the user to enter a new signal name. Entering an M for the signal name will return the user to the main menu.

Figure 11A:
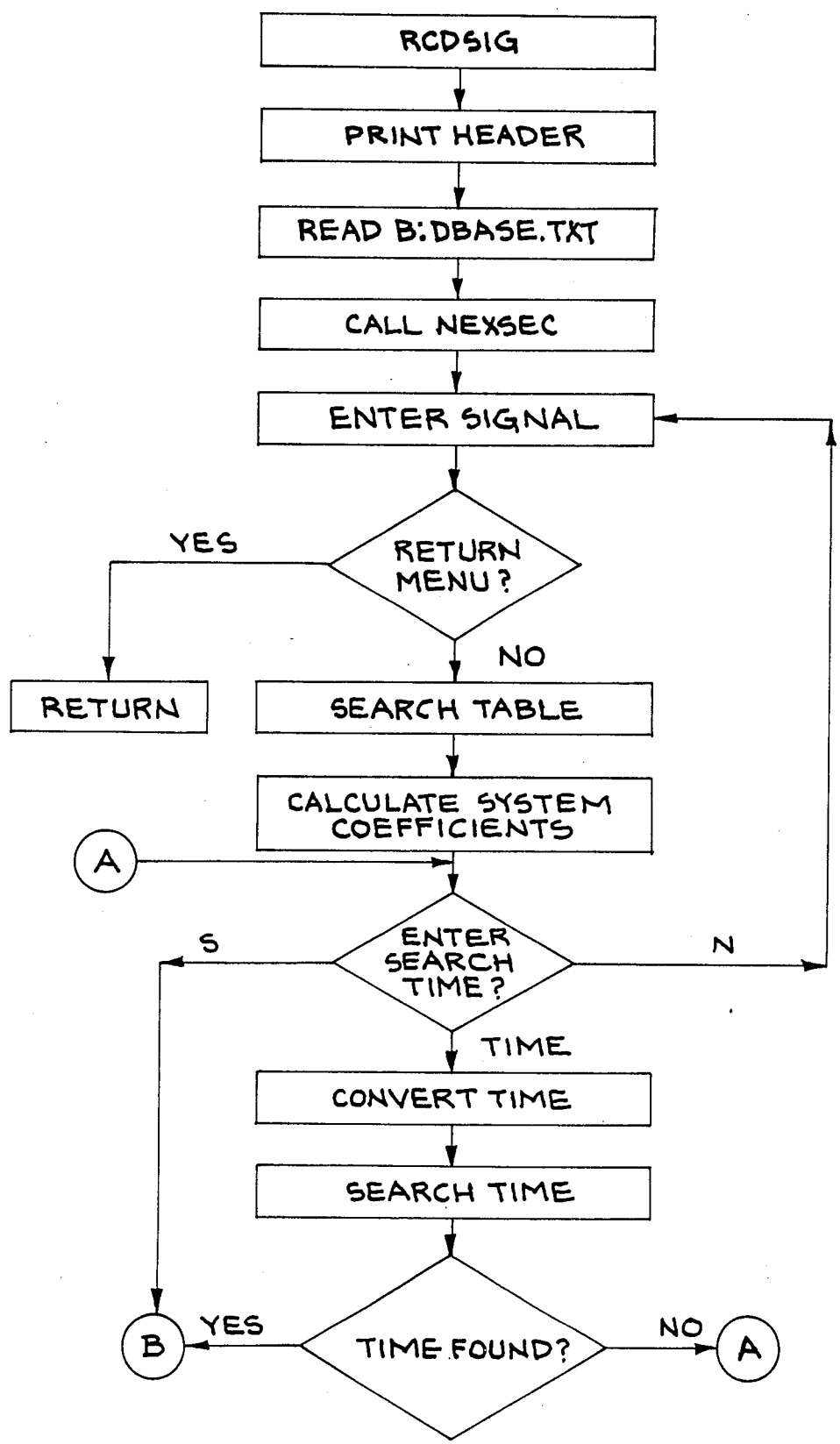
Figure 11B:
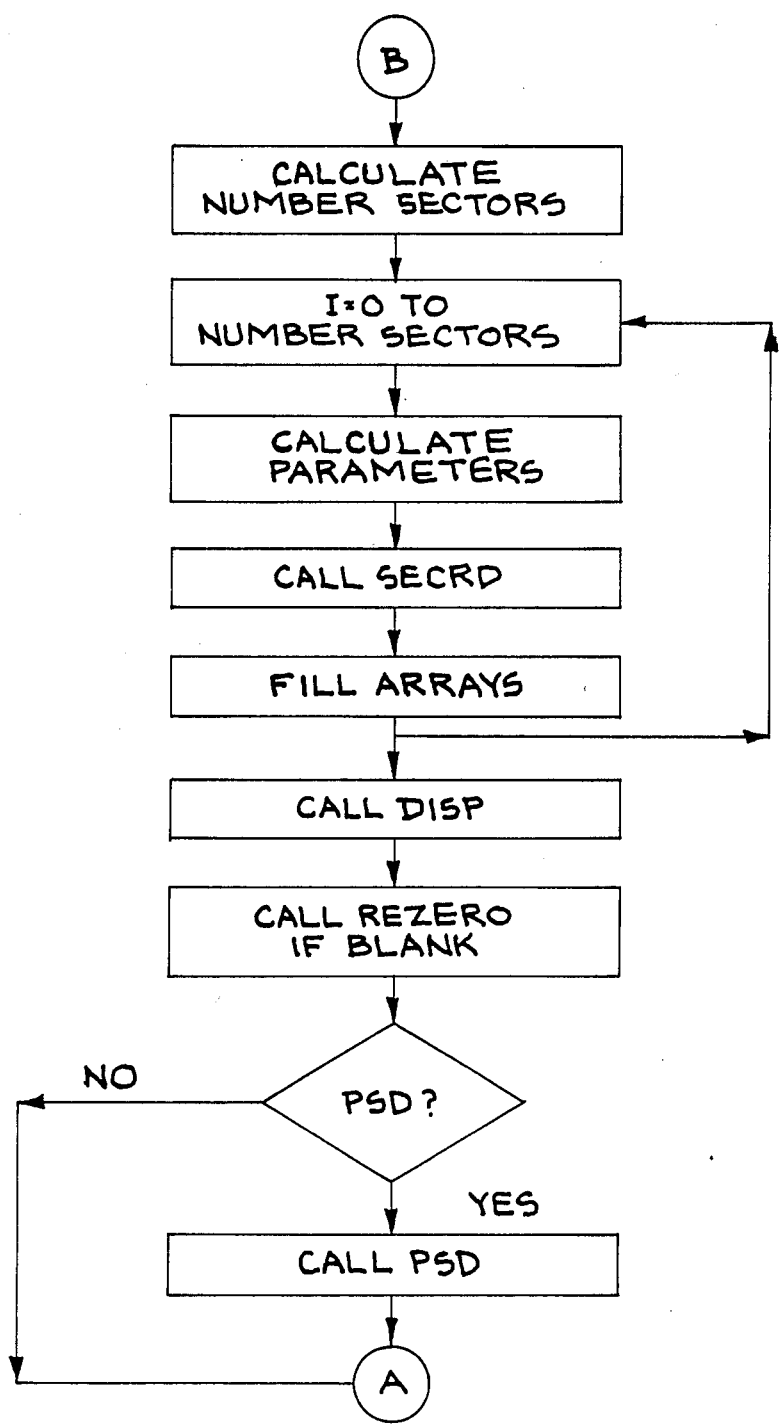

PSD calls FFT which is an assembly language routine to do a fast Fourier transform and then form a power spectral density of data in the array CDAT. PSD then finds the maximum value and auto scales the data. The function FGRAPH is called to put out the actual graphics plot. After the PSD is displayed, the user is asked for the next time to search. The function RCDSIG is shown in FIGS. 11A and 11B.

When the REALTIME DATA Option is chosen, the program calls the function RELSIG. RELSIG prints a header on the terminal and reads in the file B:DBASE.TXT. A signal table of name, sample rate, gain, word position, and A and B coefficients if created. The user is prompted to enter the signal name. The signal table is searched for a match with the user's entry. If a match is not found, the user is asked to reenter the signal name. When a match is found, the function RTIME is called. Using the word position and interval between samples RTIME puts 512 samples of data into the CDAT array in the common block. In addition RTIME fills the four time arrays with the time for each frame. RELSIG then will fill in any missing points in the time arrays for signals that are sampled more than once per frame. RELSIG uses DISP to send a time history plot of the signal to the graphics display. DISP uses the functions MEAN and STD to find the mean and standard deviation of the signal array. The array is then searched to find the maximum and minimum points. DISP calls TGRAPH to put the actual graphic information out. The user is then asked if they want a PSD. If the answer is no, the user is asked to enter the next signal. Entering an M will return to the main menu.

Figure 12:
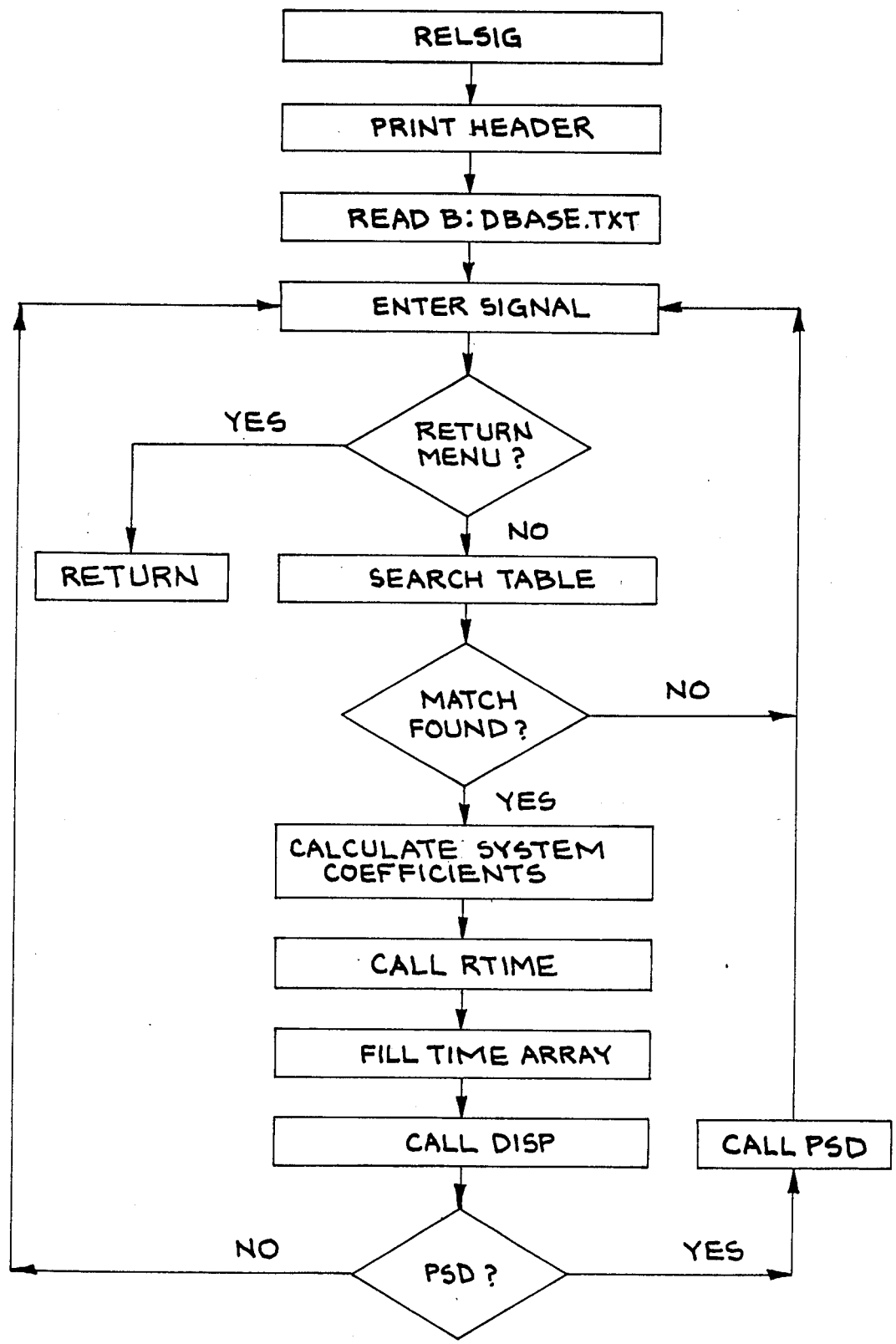

PSD calls FFT which is an assembly language routine to do a fast Fourier transform and then form a power spectral density of the data in the array CDAT. PSD then finds the maximum value and autoscales the data. The function FGRAPH is called to put out the actual graphics plot. The function RELSIG is shown in FIG. 12.

The SIGNAL LIST option causes the function SIGLST to be called. SIGLST then reads the alphabetical data base file from the floppy disk called B:DBASE.TXT. SIGLST prints the name of each of the signals contained in the file on the screen and asks the user to input an M to return to the main menu. This Using the word position and interval between samples RTIME puts 512 samples of data into the CDAT array in the common block. In addition RTIME fills the four time arrays with the time for each frame. RELSIG then will fill in any missing points in the time arrays for signals that are sampled more than once per frame. RELSIG uses DISP to send a time history plot of the signal to the graphics display. DISP uses the functions MEAN and STD to find the mean and standard deviation of the signal array. The array is then searched to find the maximum and minimum points. DISP calls TGRAPH to put the actual graphic information out. The user is then asked if they want a PSD. If the answer is no, the user is asked to enter the next signal. Entering an M will return to the main menu.

PSD calls FFT which is an assembly language routine to do a fast Fourier transform and then form a power spectral density of the data in the array CDAT. PSD then finds the maximum value and autoscales the data. The function FGRAPH is called to put out the actual graphics plot. The function RELSIG is shown in FIG. 12.

The SIGNAL LIST option causes the function SIGLST to be called. SIGLST then reads the alphabetical data base file from the floppy disk called B:DBASE.TXT. SIGLST prints the name of each of the signals contained in the file on the screen and asks the user to input an M to return to the main menu. This DBREAD now creates the files B:SETMAP.TXT and B:SETSYS.TXT from the information in the file B:DBASE.TXT just retrieved. The creation of these files is a two step process. First two temporary files B:SETYS.TMP and B:STEPMAP.TMP are created which contain quotes around strings. The next step is to read the temporary files and write the information without the quotes to the files B:STEPMAP.TXT and B:SETYS.TXT. B:STEPMAP.TXT is the file that contains the channel number information to be loaded into the MAP RAM. B:SETYS.TXT contains the information to set the gain, filter frequency, and sample and hold rate for each of the analog channels.

DBREAD then calls SETSYS and SETMAO to put the recovered data base into effect. After reloading the setup values DBREAD returns the user to the main menu. The function DBREAD is shown in FIG. 14.

By using the EXIT option the user exits from the Micro Mushroom operating program. To return to the Micro Mushroom program the user should type RUN.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A data recording system which records data in a spiral format, said data recording system comprising:
    a data receiving means which includes an analog front end which receives data in the from of analog signals and conditions said analog signals for conversion into a first set of digital signals, said analog front end producing thereby conditioned analog signals;
    a digital front end which receives data in the form of digital signals and outputs a second set of digital signals;
    a multiplexing means which receives said conditioned analog signals from said analog front end and converts them into said first set of digital signals, said multiplexing means also receiving said second set of digital signals from said digital front end and producing a continuous data stream by multiplexing said first and second set of digital signals;
    a means of producing timing signals which sends said timing signals to: said analog front end, and said digital front end;
    a disk drive which receives said continuous data stream and said timing signals from said producing means, and said multiplexing means, said disk drive also receiving instruction signals and recording said continuous data stream on a disk in said spiral format in response thereto; and
    a means of controlling the disk drive which receives said timing signals from the producing means and transmits said instruction signals to said disk drive to cause it to record said continuous data stream in said spriral format.

2. A data recording system, as defined in claim 1, wherein said data receiving means includes:
    a first and second interface, said first interface conducting said timing signals from said producing means to said controlling means; and
    said second interface receiving and conducting said timing signals and said continuous data stream from said multiplexing means to said disk drive.

3. A data recording system, as defined in claim 2, wherein said controlling means comprises:
    a microprocessor which receives said timing signals from said first interface and sends said instruction signals to said second interface; and
    a terminal connected to said microprocessor which allows a user to direct said microprocessor to send said instruction signals.

* * * * *